Dec. 30, 1952         F. A. KRÖGER         2,623,858
ZINC SULFIDE PHOSPHORS CONTAINING ALUMINUM
Filed Jan. 4, 1950
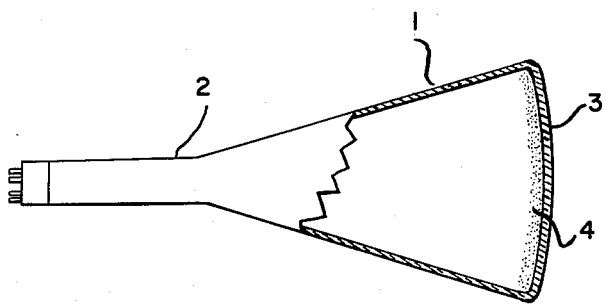
INVENTOR
FERDINAND ANNE KROGER
BY
AGENT Patented Dec. 30, 1952

2,623,858

UNITED STATES PATENT OFFICE 2,623,858

ZINC SULFIDE PHOSPHORS CONTAINING ALUMINUM

Ferdinand Anne Kröger, Eindhoven, Netherlands, assignor to Hartford National Bank and Trust Company, Hartford, Conn., as trustee Application January 4, 1950, Serial No. 136,757
In the Netherlands January 14, 1949

5 Claims. (Cl. 252—301.6)

In electric discharge tubes use is frequently made of luminescent materials which are of different compositions according to the functions they have to fulfill. Some of the materials most commonly employed are the sulphides or selenides of zinc and cadmium. As is well known, these substances when activated with heavy metals, upon excitation by electrons or ultra-violet rays, produce light the position of which in the spectrum is dependent on the activators employed, on the ratio between the zinc, the cadmium, the sulphur and the selenium and furthermore on the manner of excitation. The material most commonly employed is, for example, zinc sulphide or zinc-cadmium sulphide or selenide activated with one or more of the elements copper, silver and gold.

It is common practice to utilize a halogen-containing fusing agent in manufacturing the above-mentioned luminescent materials. The use of chlorides, bromides of iodides involves disadvantages which are due to the fact that the halides have two functions, viz:

a. a crystallising function
b. an essential function in building-up the centres of luminescence in the crystal lattice.

Fluorides occupy an exceptional position, since they only fulfill the function (a). Furthermore it may be observed with regard to (a) that this function mostly becomes manifest in a decrease of the temperature at which the material may be produced.

The disadvantage proper which is inherent in the use of chlorides, bromides or iodides is attributable to the fact that the quantities required for the functions (a) and (b) are, as a rule, greatly different. Consequently, if the optimum quantity is chosen for one function, optimum action is not obtained in the other function.

An electric discharge tube according to the invention comprises a luminescent substance built up from at least one element from each of the following groups:

1. Zinc and cadmium.
2. Sulphur and selenium.
3. Copper, silver and gold.
4. Aluminum.

An electric discharge tube according to the invention thus comprises a luminescent substance built up from at least one element of the subgroup of the second column of the periodic system of elements having an atomic number between 29 and 49, at least one element of the subgroup of the first column of the periodic system of elements, at least one element of the main group of the sixth column of the periodic system of elements having an atomic number between 15 and 35 and aluminum.

The quantity of aluminum is preferably between $10^{-5}$ and 30 atoms per 100 atoms of zinc plus cadmium.

The other elements of the luminescent material are available in such quantities as employed hitherto for the activated selenides or sulpho-selenides of zinc and/or cadmium.

From experiments leading up to the invention, it has been found that aluminum can take over the function (b) of the halogen. Consequently, in building-up a luminescent substance for a discharge tube according to the invention, there is complete freedom to choose the optimum quantity of halide for the function (a).

Another advantage afforded by the invention is that the halide may in certain cases be left out, since the substance employed in a discharge tube according to the invention may be heated to a high temperature in order to reach the desired state of crystallisation. This is frequently impossible in compounds in which halogen fulfills the function (b), since a halide readily evaporates at such high temperatures. Halogen is furthermore interfering, if the discharge tube in which the luminescent substance is used contains parts which are sensitive to small amounts of halogen.

In the preparation of luminescent substances the crystallizing agents used may be the fluorides of aluminum, beryllium, magnesium, calcium, strontium, barium, zinc or cadmium.

Some luminescent materials adapted for use in a discharge tube according to the invention are:

1. Zinc sulphide with silver and aluminum, which exhibits glue fluorescence with a maximum at approximately 4400 Å;
2. Zinc-cadmium sulphide with gold and aluminum, which exhibits a fluorescence from yellow-green to dark-red as a function of the content of cadmium.
3. Zinc-sulphide with copper and aluminum, which exhibits green to blue fluorescence as a function of the content of copper with maxima at 5300 Å and 4500 Å.

The luminescence of the three said substances is obtained upon excitation either by electrons, by X-rays or ultraviolet rays.

In order that the invention may be readily carried into effect, some examples of the preparation of different luminescent substances are given below.

Example I 100 gms. of ZnS are moistened with 100 ccs. of an aqueous solution of $AgNO_3$ containing $10^{-3}$ gm.-atom of silver per litre and with 30 ccs. of a solution of $Al(NO_3)_3$ containing $10^{-2}$ gm.-atom of aluminum per litre. After evaporation to dryness, the mass is vigorously mixed and subsequently heated in a quartz beaker at 1200° C. for 1 hour in an atmosphere of $H_2S$. The product thus obtained exhibits blue fluorescence.

Example II

A mixture consisting of 80 gms. of ZnS and 20 gms. of CdS is moistened with 100 ccs. of aqueous solution of $AuCl_3$ containing $10^{-4}$ gm.-atom of gold per litre; after evaporation to dryness of the reaction mixture, this has added to it 20 gms. of $AlF_3$ and both are vigorously mixed together. Subsequently, the mass thus obtained is heated in a quartz beaker at 1100° C. for 0.5 hour in an atmosphere of $H_2S$. The product exhibits orange-yellow fluorescence and phosphorescence.

Example III 100 gms. of ZnS are moistened with 100 ccs. of a $CuNO_3$ solution containing $10^{-3}$ gm.-atom of copper per litre and with 50 ccs. of a solution of $Al(NO_3)_3$ containing $10^{-2}$ gm.-atom of aluminum per litre. After evaporation to dryness of the reaction mixture, 5 gms. of $CaF_2$ are added, whereafter the whole product is vigorously mixed and subsequently heated in a quartz beaker at 1150° C. for 0.5 hour in an atmosphere of $H_2S$. The product thus obtained exhibits green fluorescence and phosphorescence.

In the three afore-mentioned examples reference is made to heating in an atmosphere of $H_2S$. As an alternative, however, heating may take place in an other sulphurising atmosphere, for example in nitrogen loaded with carbon disulphide. As a further alternative, sulphur may be added to the substance mixture and heating may be effected in a closed beaker, if desired with the use of nitrogen, hydrogen or hydrogen sulphide as a protective atmosphere as described in the example following hereinafter.

Example IV 80 gms. of ZnS and 20 gms. of ZnSe are mixed and moistened with 100 ccs. of an aqueous solution of $AgNO_3$ containing $10^{-3}$ gm.-atom of silver per litre and with 30 ccs. of a solution of $Al(NO_3)_3$ containing $10^{-2}$ gm.-atom of aluminum per litre. After evaporation to dryness, 2 gms. of powdery sulphur are added, the mass is vigorously mixed and subsequently introduced into a quartz beaker having a tightly closing cover. The air is expelled from the quartz beaker by the introduction of nitrogen, the beaker is closed and heated at 1100° C. for 1 hour. When use is made of a beaker having a cover which closes not particularly tightly, the heating process must be effected in a protective atmosphere of nitrogen, hydrogen or hydrogen sulphide. The product obtained has a blue-green luminescence.

What I claim is:

1. A luminescent material consisting essentially of a member of the group consisting of sulphides, selenides and sulpho-selenides of zinc and and cadmium and about $10^{-5}$ to 30 atoms of aluminum for each 100 atoms of zinc and cadmium to build up centers of luminescence in the material, said member being activated by a metal selected from the group consisting of copper, silver, and gold.

2. A luminescent material consisting essentially of a member of the group consisting of sulphides, selenides and sulpho-selenides of zinc and cadmium and about 10 to 30 atoms of aluminum for each 100 atoms of zinc and cadmium to build up centers of luminescence in the material, said member being activated by a metal selected from the group consisting of copper, silver and gold, and a fluoride flux.

3. A luminescent material consisting essentially of zinc sulphide and about $10^{-5}$ to 30 atoms of aluminum for each 100 atoms of zinc to build up centers of luminescence in the material, said sulphide being activated by copper.

4. A luminescent material consisting essentially of zinc-cadmium sulphide and about $10^{-5}$ to 30 atoms of aluminum for each 100 atoms of zinc and cadmium to build up centers of luminescence in the material, said sulphide being activated by gold.

5. A luminescent material consisting essentially of zinc sulphide about $10^{-5}$ to 30 atoms of aluminum for each 100 atoms of zinc to build up centers of luminescence in the material, said sulphide being activated by silver.

FERDINAND ANNE KRÖGER.

REFERENCES CITED

The following references are of record in the file of this patent:

UNITED STATES PATENTS

| Number | Name | Date |
| --- | --- | --- |
| 2,446,248 | Shrader | Aug. 3, 1948 |
| 2,446,764 | Henderson | Aug. 10, 1948 |
| 2,452,522 | Leverenz | Oct. 26, 1948 |
| 2,476,619 | Nicoll | July 19, 1949 |
| 2,479,158 | Froelich | Aug. 16, 1949 |